(12) United States Patent
Zilic (10) Patent No.: US 11,732,831 B2
(45) Date of Patent: Aug. 22, 2023

(54) FLUID FLOW CONNECTOR

(71) Applicant: Honeywell International Inc., Charlotte, NC (US)

(72) Inventor: Kyle Thomas Zilic, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/248,748

(22) Filed: Feb. 5, 2021

(65) Prior Publication Data

US 2022/0252197 A1 Aug. 11, 2022

(51) Int. Cl.
*F16L 39/00* (2006.01)

(52) U.S. Cl.
CPC .................................. *F16L 39/005* (2013.01)

(58) Field of Classification Search
CPC ...................................................... F16L 39/005
USPC ...................................................... 285/121.12
See application file for complete search history.

(56) References Cited

U.S. PATENT DOCUMENTS

| | | | | |
|---|---|---|---|---|
| 4,732,414 A | * | 3/1988 | Inaba | F16L 39/005 |
| 2004/0026922 A1 | | 2/2004 | Carns et al. | |
| 2013/0049355 A1 | * | 2/2013 | Weinhold | F16L 39/005 |
| 2015/0369400 A1 | * | 12/2015 | Dill | F16L 39/005 |
| 2017/0051852 A1 | * | 2/2017 | Kocourek | F16L 19/0218 |
| 2021/0190245 A1 | * | 6/2021 | Kashy | F16L 23/18 |

FOREIGN PATENT DOCUMENTS

| | | | | |
|---|---|---|---|---|
| CN | 104847981 A | | 8/2015 | |
| EP | 2058573 A1 | * | 5/2009 | ............ F16L 39/005 |
| KR | 10-2010-0136238 A | | 12/2010 | |
| WO | WO-2015195164 A1 | * | 12/2015 | ............ F16L 39/005 |

OTHER PUBLICATIONS

Extended European Search Report dated Apr. 25, 2022 for EP Application No. 21210329, 9 pages.
Intention to grant dated May 4, 2023 for EP Application No. 21210329, 8 page(s).

* cited by examiner

*Primary Examiner* — Zachary T Dragicevich
(74) *Attorney, Agent, or Firm* — Alston & Bird LLP (57) ABSTRACT

Apparatuses, devices, systems, and methods are described that provide fluid flow connectors. An example fluid flow connector includes a first connector body that defines a first inner bore and a first plurality of outer bores. The example connector further includes a second connector body that defines a second inner bore and a second plurality of outer bores. In an operational configuration in which the first connector body is attached to the second connector body, the first inner bore mates with the second inner bore to form a first fluid channel, and each of the first plurality of outer bores mate with a respective one of the second plurality of outer bores to form a second fluid channel. The example connector further includes a sealing mechanism that, in the operational configuration, seals the first fluid channel from the second fluid channel and seal the second fluid channel from an external environment of the fluid flow connector.

18 Claims, 7 Drawing Sheets

FIG. 7

FLUID FLOW CONNECTOR

GOVERNMENTAL RIGHTS

This invention was made with Government support. The Government has certain rights in this invention.

TECHNOLOGICAL FIELD

Example embodiments of the present invention relate generally to fluid systems and, more particularly, to connectors for use with counter-flow fluid systems.

BACKGROUND

In fluid flow systems, various conduits, channels, and/or connections are used to ensure that fluid communication is properly provided between system components. In some instances, the fluids transferred by these systems are caustic or otherwise damaging to system components, system operators, or the like if leaked from their associated channels. In some instances, the fluids transferred by these systems are cryogenic or otherwise sufficiently cold in temperature such that the likelihood of fluid leaks is increased. Through applied effort, ingenuity, and innovation many deficiencies of such prior fluid flow systems have been solved by developing solutions that are structured in accordance with the embodiments of the present invention, many examples of which are described in detail herein.

BRIEF SUMMARY

Apparatuses, devices systems, and associated methods are provided for fluid flow connectors. An example fluid flow connector may include a first connector body that may define a first inner bore and a first plurality of outer bores. The example connector may further include a second connector body that defines a second inner bore and a second plurality of outer bores. In an operational configuration in which the first connector body is attached to the second connector body, the first inner bore may be configured to mate with the second inner bore to form a first fluid channel, and the first plurality of outer bores may each be configured to mate with a respective one of the second plurality of outer bores to form a second fluid channel. The example connector may further include a sealing mechanism configured to, in the operational configuration, seal the first fluid channel from the second fluid channel and seal the second fluid channel from an external environment of the fluid flow connector.

In some embodiments, in the operational configuration, the first fluid channel and the second fluid channel may be concentric such that the second fluid channel surrounds the first fluid channel. In such an embodiment, the sealing mechanism may include a first sealing element disposed circumferentially around the first fluid channel and a second sealing element disposed circumferentially around the second fluid channel.

In some embodiments, the first connector body may further define a first groove configured to receive a first sealing element therein. The first groove may be positioned circumferentially around the first inner bore. The first connector body may further define a second groove configured to receive a second sealing element therein. The second groove may be positioned circumferentially around the first plurality of outer bores.

In some further embodiments, the second connector body may further define a first sealing surface that may be configured to abut the first sealing element positioned within the first groove. The second connector body may also include a second sealing surface that may be configured to abut the second sealing element positioned within the second groove.

In some still further embodiments, the first sealing element and the second sealing element may include a malleable, cryogenic sealing material. In such an embodiment, the first sealing element and the second sealing element may include indium.

In some other embodiments, the first groove and the second groove may each define a deformation feature configured to plastically deform the first sealing element and the second sealing element, respectively.

In some embodiments, the first connector body and the second connector body may each define one or more through-holes configured to receive corresponding bolts therein such that, in the operational configuration, the bolts are configured, via the through-holes, to secure the first connector body to the second connector body.

In other embodiments, the fluid flow connector may further include a screwed flange configured to secure the first connector body to the second connector body.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As described above, fluid flow systems may rely upon a plurality of various conduits, channels, and/or connections that are used to ensure that fluid communication is properly provided between system components. By way of example, a counter-flow fluid system may employ two or more distinct fluid channels nested within one another. Although not limited to fluid flow in opposite directions, such systems may include a first fluid within a channel that flows in a first direction and a second fluid within a second channel that flows in a second, opposing direction. Such systems may be used as heat exchangers, and the fluids used by these systems may be valuable (e.g., expensive to replace), caustic (e.g., damaging if leaked to an external environment), and/or cryogenic (e.g., of a sufficiently low temperature, such as below 124 K, in an example embodiment). Due to the nature of the fluids transferred in these fluid channels, connections between these channels must be properly sealed in order prevent cross-contamination of fluids as well as to prevent leakage of these fluids to an external environment.

For cryogenic systems, for example, traditional sealing techniques and materials are often ineffective in sealing fluid system components as the contraction of these materials (e.g., elastomers or the like) at cold temperatures results in leakage between system components. Furthermore, conventional connectors, adapters, or the like modify the nested shape or nature of counter-flow fluid system (e.g., T-junctions or the like) by reducing the thermal efficiencies associated with nested fluid flow systems. In order to address these issues and others, the devices of the present disclosure provide fluid flow connectors that maintain the nested positioning of fluid channels while also providing sealing mechanisms that are operable in cryogenic systems. In doing so, the embodiments of the present application may reduce the inefficiencies of traditional fluid flow connectors while also preventing fluid leakage associated with these systems.

Fluid Flow Connector

Figure 1A:
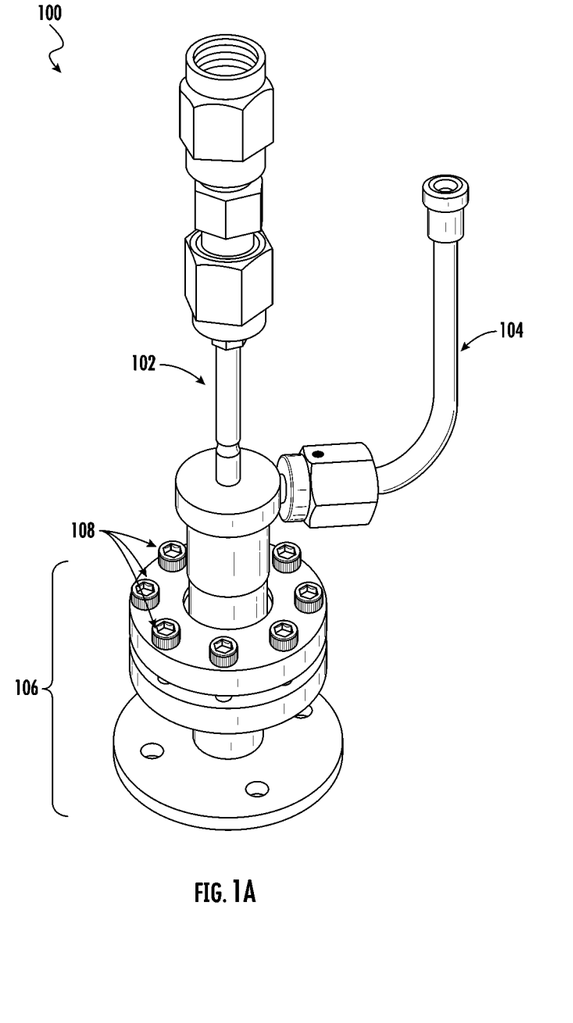
FIGS. 1A-1B are perspective views of a fluid flow system for implementing one or more embodiments of the present disclosure.
Figure 1B:
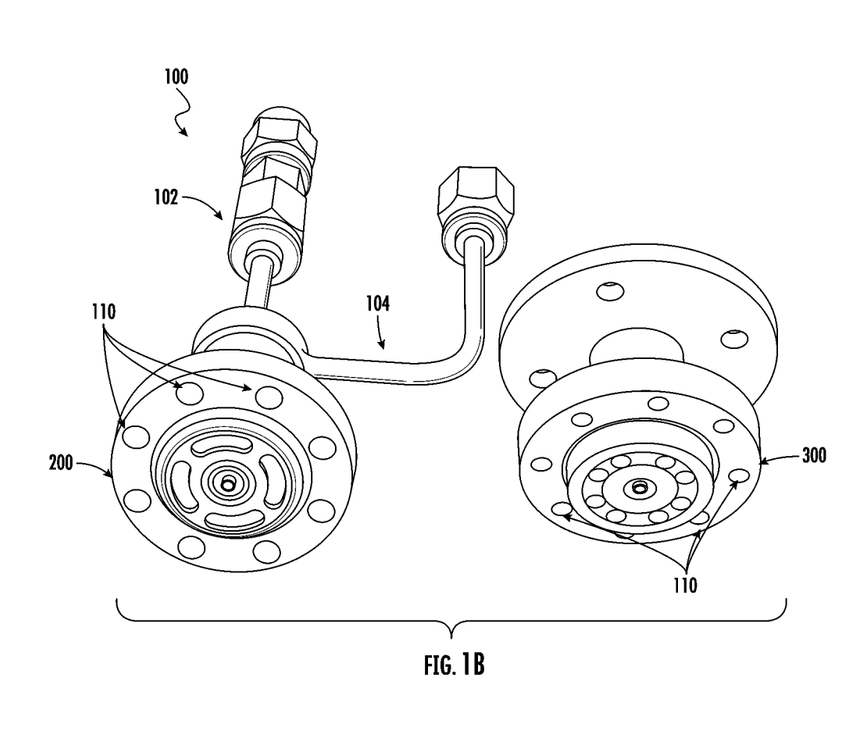

With reference to FIGS. 1A-1B, an example fluid flow system 100 for implementing one or more embodiments of the present disclosure is illustrated. As shown, the example fluid flow system 100 may include a first fluid supply line 102, a second fluid supply line 104, and a fluid flow connector 106. As described hereafter, the first fluid supply line 102 may be, in some embodiments, configured to support a first fluid therein and be in fluid communication with the fluid flow connector 106 so as to supply the first fluid to the fluid flow connector 106. Similarly, the second fluid supply line 104 may be, in some embodiments, configured to support a second fluid therein and be in fluid communication with the fluid flow connector 106 so as to supply the second fluid to the fluid flow connector 106. In some embodiments, the temperature of the first fluid and the second fluid may differ such that the fluid maintained within the fluid channels described hereafter may operate as a heat exchanger. Said differently, heat may be exchanged between the first fluid and the second fluid such that the temperature of the fluids at any downstream location within the fluid channels is substantially the same. Furthermore, although described herein as supplying fluid to fluid flow connector 106, the present disclosure contemplates that the flow direction of either the first fluid supply line 102 or the second fluid supply line 104 may vary such that the fluid supply lines 102, 104 may further operate to outlet fluid received from the fluid flow connector 106. Additionally, the present disclosure contemplates that fluids of any type may be used by the fluid supply lines 102, 104 and the fluid flow connector based upon the intended application of the fluid flow system 100.

With continued reference to FIGS. 1A-1B, the fluid flow connector 106 may include a first connector body 200 and a second connector body 300 described hereafter with reference to FIGS. 2A-3C. As shown in FIGS. 1A-1B, in some embodiments, the first connector body 200 and the second connector body 300 may each define a plurality of through-holes 110 configured to receive corresponding bolts 108. The engagement between the through-holes 110 and the corresponding bolts 108 may operate, as described hereafter, to attach or otherwise physically secure the first connector body 200 with the second connector body 300. As further described hereafter, this attachment referred to hereafter as an operational configuration (e.g., as shown in FIG. 1A), may operate to create fluid channels (e.g., a first fluid channel and a second fluid channel) through which fluid supplied by the first fluid supply line 102 and the second fluid supply line 104 may flow. As described hereafter with reference to FIG. 4, the present disclosure contemplates other mechanisms for securing the first connector body 200 with the second connector body 300 based upon the intended application of the fluid flow connector 106.

In various embodiments, the first connector body comprises a fluid supply end opposite a mating end. The mating end comprises a mating surface. The fluid supply end is coupled to the first fluid supply line 102 and/or second fluid supply line 104. The mating end is configured to be coupled to a mating end of the second connector body 300, when the fluid flow connector 106 is in the operational configuration. For example, the mating surface of the first connector body 200 may be butt coupled to the mating surface of the second connector body 300, when the fluid flow connector 106 is in the operational configuration.

Figure 2A:
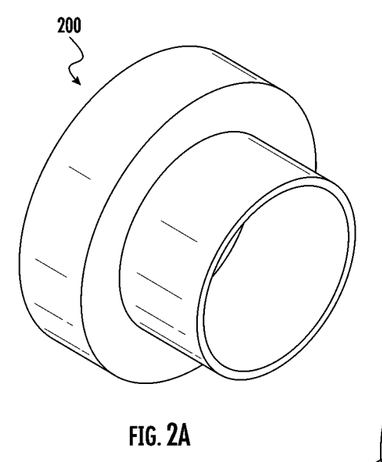
FIGS. 2A-2C are various perspective views of a first connector body according to an example embodiment.
Figure 2B:
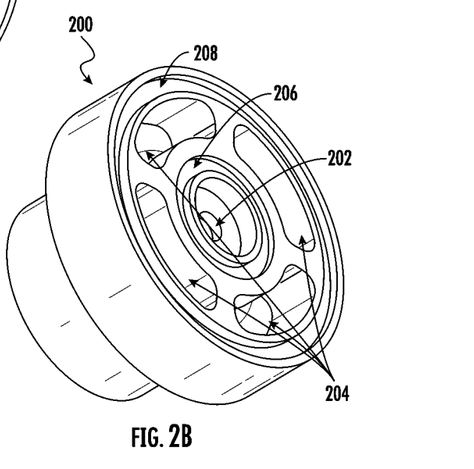
Figure 2C:
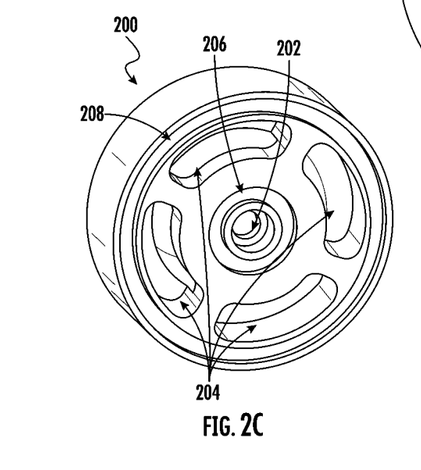

With reference to FIGS. 2A-2C, an example first connector body 200 is illustrated. As shown, the first connector body 200 may, in some instances, be referred to as a female gland, connector, connector body, or the like in that the first connector body 200 defines the first groove 206 and second groove 208, collectively referred to as the sealing mechanism. In various embodiments, the mating surface of the first connector body 200 comprises the first groove 206 and/or the second groove 208. The present disclosure, however, contemplates that the first connector body 200 may instead include the features of the second connector body 300, in some embodiments, such that the second connector body 300 is instead referred to as the female gland, connector, connector body, or the like. Said differently, the term first connector body 200 may be used to refer to the portion of the fluid flow connector 106 that defines the sealing mechanism as described hereafter. Furthermore, as illustrated in FIGS. 2A-2C, the first connector body 200 may be formed or otherwise dimensioned (e.g., sized and shaped) as a cylindrical member or as having a circular cross-sectional shape in a cross-section taken substantially perpendicular to an intended fluid flow direction through the fluid flow connector. The present disclosure, however, contemplates that the dimensions or shape of the first connector body 200 may vary based on the intended application of the fluid flow connector 106.

With continued reference to FIGS. 2A-2C, the first connector body 200 may define a first inner bore 202 located substantially at the center of the first connector body 200. Given the nested flow configuration described herein, the central location of the first inner bore 202 may allow subsequent openings (e.g., the first plurality of outer bores 204) to substantially surround the first inner bore 202. As described hereafter with reference to the operational configuration of FIG. 4, the first inner bore 202 may be configured to be in fluid communication with the first fluid supply line 102 such that, in combination with the second inner bore 302 of the second connector body 300 described hereafter, the first inner bore 202 may form a portion of the first fluid supply channel (e.g., first fluid supply channel 402 in FIG. 4) for transferring the first fluid supplied by the first fluid supply line 102. Although illustrated as a circular bore, the present disclosure contemplates that the first inner bore 202 may include any opening, aperture, through-hole, etc. through which fluid may flow and may have any cross-sectional shape.

The first connector body 200 may further define a first plurality of outer bores 204. As shown, the first plurality of outer bores 204 may be positioned radially around the first inner bore 202. In some embodiments, the first plurality of outer bores 204 may define four (4) semicircular or arcuate openings disposed circumferentially around the first inner bore 202. As described hereafter with reference to the operational configuration of FIG. 4, the first plurality of outer bores 204 may be configured to be in fluid communication with the second fluid supply line 104 such that, in combination with the second plurality of outer bores 304 of the second connector body 300 described hereafter, the first plurality of outer bores 204 may form a portion of the second fluid supply channel (e.g., second fluid supply channel 402 in FIG. 4) for transferring the second fluid supplied by the second fluid supply line 104. Although illustrated as a plurality of semicircular or arcuate bores, the present disclosure contemplates that the first plurality of outer bores 204 may include any collection of openings, apertures, through-holes, etc. through which fluid may flow and may have any cross-sectional shape.

With continued reference to FIGS. 2B-2C, the first plurality of outer bores 204 may be formed between an exterior surface of the first connector body 200 and the outer wall of the first inner bore 202. In this way, the size and/or number of bores that comprise the first plurality of outer bores 204 may be bounded or otherwise limited by the need for structural support for the first inner bore 202. Said differently, attachment between the first inner bore 202 and the exterior wall or other structure of the first connector body 200 may be necessary, in some embodiments, to suspend the first inner bore 202 along the center of the first connector body 200. As such, the present disclosure contemplates that the first plurality of outer bores 204 may include any size, shape, feature, form, or the like, so long as the first inner bore 202 is supported within the first connector body 200.

Figure 4:
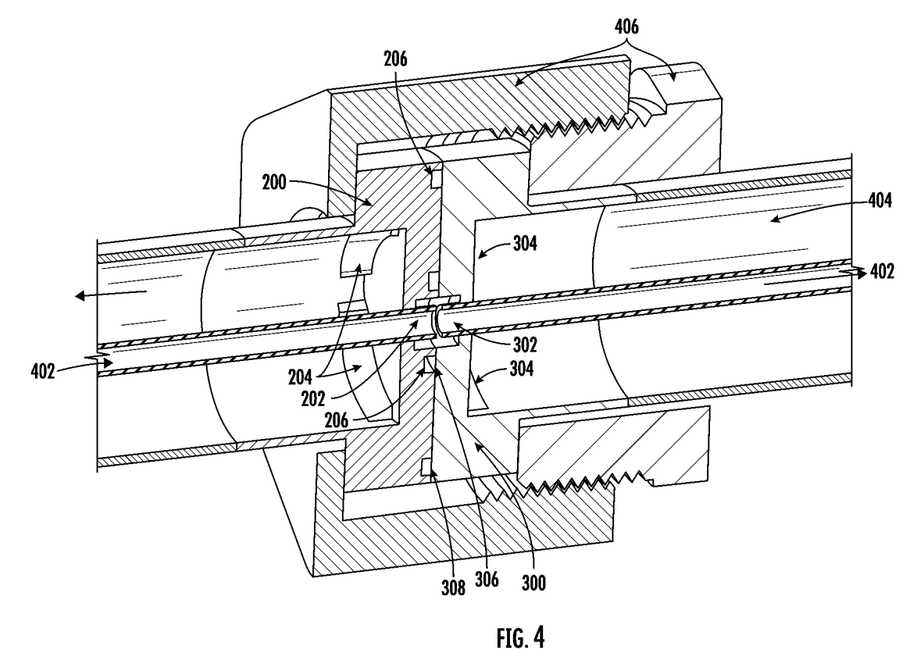
FIG. 4 is a cross-sectional view of an example fluid flow connector in an operational configuration according to an example embodiment.

The first connector body 200 may further define a sealing mechanism (e.g., a first groove 206 and a second groove 208) configured to, in the operational configuration as described hereafter with reference to FIG. 4, seal the first fluid channel (e.g., the mated first inner bore 202 and the second inner bore 302) from the second fluid channel (e.g., the mated first plurality of outer bores 204 and the second plurality of outer bores 304) and seal the second fluid channel from an external environment of the fluid flow connector 106. As shown, the first groove 206 may be positioned circumferentially around the first inner bore 202 and configured to receive a first sealing element (e.g., sealing element 500 in FIG. 5) therein. The first sealing element received by the first groove 206 may be configured to abut or otherwise contact a corresponding sealing surface (e.g., first sealing surface 306) of the second connector body 300. The contact between the first sealing element within the first groove 206 and the corresponding surface of the second connector body 300 may operate to seal the first fluid channel (e.g., the mated first inner bore 202 and the second inner bore 302) from the second fluid channel (e.g., the mated first plurality of outer bores 204 and the second plurality of outer bores 304). Although described herein with respect to a first groove 206, the present disclosure contemplates that any trough, channel, indenture, or the like may be used to support a corresponding first sealing element as described herein.

With continued reference to FIGS. 2B-2C, the first connector body 200 may further define a second groove 208 that may be positioned circumferentially around the first plurality of outer bores 204 and configured to receive a second sealing element (e.g., sealing element 500 in FIG. 5) therein. The second sealing element received by the second groove 208 may be configured to abut or otherwise contact a corresponding sealing surface (e.g., second sealing surface 308) of the second connector body 300. The contact between the second sealing element within the second groove 208 and the corresponding surface of the second connector body 300 may operate to seal the second fluid channel (e.g., the mated first plurality of outer bores 204 and the second plurality of outer bores 304) from an external environment of the fluid flow connector 106. Although described herein with respect to a second groove 208, the present disclosure contemplates that any trough, channel, indenture, or the like may be used to support a corresponding second sealing element as described herein.

Figures 3A, 3B, 3C:
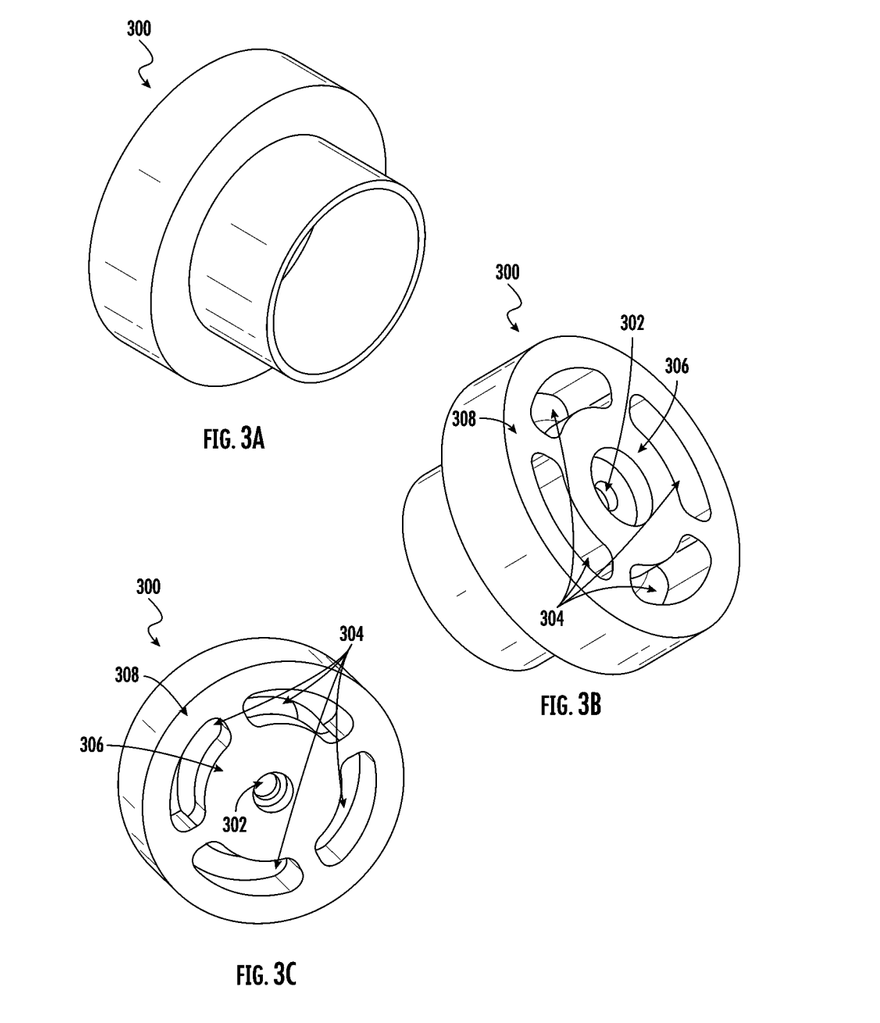
FIGS. 3A-3C are various perspective views of a second connector body according to an example embodiment.

With reference to FIGS. 3A-3C, an example second connector body 300 is illustrated. As shown, the second connector body 300 may, in some instances, be referred to as a male gland, connector, connector body, or the like in that the second connector body 300 defines the first sealing surface 306 and second sealing surface 308. The present disclosure, however, contemplates that the second connector body 300 may instead include the features of the first connector body 200, in some embodiments, such that the first connector body 200 is instead referred to as the male gland, connector, connector body, or the like. Said differently, the term second connector body 300 may be used to refer to the portion of the fluid flow connector 106 that defines the sealing surfaces as described hereafter. Furthermore, as illustrated in FIGS. 3A-3C, the second connector body 300 may be formed or otherwise dimensioned (e.g., sized and shaped) as a cylindrical member or as having a circular cross-sectional shape. The present disclosure, however, contemplates that the dimensions or shape of the second connector body 300 may vary based on the intended application of the fluid flow connector 106.

With continued reference to FIGS. 3A-3C, the second connector body 300 may define a second inner bore 302 located substantially at the center of the second connector body 300. Given the nested flow configuration described herein, the central location of the second inner bore 302 may allow subsequent openings (e.g., the second plurality of outer bores 304) to substantially surround the second inner bore 302. As described hereafter with reference to the operational configuration of FIG. 4, the second inner bore 302 may be configured to be in fluid communication with the first fluid supply line 102 such that, in combination with the first inner bore 202 of the first connector body 200 described hereafter, the second inner bore 302 may form a portion of the first fluid supply channel (e.g., first fluid supply channel 402 in FIG. 4) for transferring the first fluid supplied by the first fluid supply line 102. Although illustrated as a circular bore, the present disclosure contemplates that the second inner bore 302 may include any opening, aperture, through-hole, etc. through which fluid may flow and may have any cross-sectional shape.

The second connector body 300 may further define a second plurality of outer bores 304. As shown, the second plurality of outer bores 304 may be positioned radially around the second inner bore 302. In some embodiments, the second plurality of outer bores 304 may define a corresponding four (4) semicircular or arcuate openings disposed circumferentially around the second inner bore 302. As described hereafter with reference to the operational configuration of FIG. 4, the second plurality of outer bores 304 may be configured to be in fluid communication with the second fluid supply line 104 such that, in combination with the first plurality of outer bores 204 of the first connector body 200 described above, the second plurality of outer bores 304 may form a portion of the second fluid supply channel (e.g., second fluid supply channel 402 in FIG. 4) for transferring the second fluid supplied by the second fluid supply line 104. Although illustrated as a plurality of semicircular or arcuate bores, the present disclosure contemplates that the second plurality of outer bores 304 may include any collection of openings, apertures, through-holes, etc. through which fluid may flow and may have any cross-sectional shape.

With continued reference to FIGS. 3B-3C, the second plurality of outer bores 304 may be formed between an exterior surface of the second connector body 300 and the outer wall of the second inner bore 302. In this way, the size and/or number of bores that comprise the second plurality of outer bores 304 may similarly be bounded or otherwise limited by the need for structural support for the second inner bore 302. Said differently, attachment between the second inner bore 302 and the exterior wall or other structure of the second connector body 300 may be necessary, in some embodiments to suspend the second inner bore 302 along the center of the second connector body 300. As such, the present disclosure contemplates that the second plurality of outer bores 304 may include any size, shape, feature, form, or the like, so long as the second inner bore 302 is supported within the second connector body 300. Additionally, in order to provide fluid communication with the first plurality of outer bores 204, the second plurality of outer bores 304 may define corresponding shapes to those defined by the first plurality of outer bores 204. Furthermore, although illustrated hereafter with a single second fluid channel, the present disclosure contemplates that, in some embodiments, each outer bore of the first plurality of outer bores 204 may mate with a respective outer bore of the second plurality of outer bores 304 and define a distinct fluid channel (e.g., a plurality of second fluid channels).

In various embodiments, the second connector body 300 comprises a fluid supply end opposite a mating end. The mating end comprises a mating surface. The fluid supply end is configured to be coupled to an element of the system that uses the fluid provided via the fluid flow system 100. The mating end is configured to be coupled to a mating end of the first connector body 200, when the fluid flow connector 106 is in the operational configuration. For example, the mating surface of the second connector body 300 may be butt coupled to the mating surface of the first connector body 200, when the fluid flow connector 106 is in the operational configuration.

The second connector body 300 may further define a first sealing surface 306 and a second sealing surface 308 configured to, in the operational configuration as described hereafter with reference to FIG. 4, seal the first fluid channel (e.g., the mated first inner bore 202 and the second inner bore 302) from the second fluid channel (e.g., the mated first plurality of outer bores 204 and the second plurality of outer bores 304) and seal the second fluid channel from an external environment of the fluid flow connector 106. In an example embodiment, the mating surface of the second connector body 300 comprises the first sealing surface 306 and/or the second sealing surface 308. As shown, the first sealing surface 306 may be positioned circumferentially around the second inner bore 302 and configured to abut or otherwise contact a corresponding first sealing element within the first groove 206 of the first connector body 200. The contact between the first sealing element within the first groove 206 and the first sealing surface 306 may operate to seal the first fluid channel (e.g., the mated first inner bore 202 and the second inner bore 302) from the second fluid channel (e.g., the mated first plurality of outer bores 204 and the second plurality of outer bores 304). Although described herein with respect to a first sealing surface 306, the present disclosure contemplates that any face or corresponding feature may be used to interface with the first sealing element as described herein.

With continued reference to FIGS. 3B-3C, the second connector body 300 may further define a second sealing surface 308 positioned circumferentially around the second plurality of outer bores 304 and configured to abut or otherwise contact a corresponding second sealing element within the second groove 208 of the first connector body 200. The contact between the second sealing element within the second groove 208 and the second sealing surface 308 may operate to seal the second fluid channel (e.g., the mated first plurality of outer bores 204 and the second plurality of outer bores 304) from an external environment of the second connector body 300. Although described herein with respect to a second sealing surface 308, the present disclosure contemplates that any face or corresponding feature may be used to interface with the second sealing element as described herein.

With reference to FIG. 4, the fluid flow connector 106 is illustrated in an operational configuration in which the first connector body 200 is attached or otherwise secured to the second connector body 300. For example, the first connector body 200 may be attached or otherwise secured to the second connector body 300 such that the mating surface of the first connector body 200 and the mating surface of the second connector body 300 abut one another. Similar to the plurality of through-holes 110 and corresponding bolts 108 described above with reference to FIGS. 1A-1B, the fluid flow connector 106 may, in some embodiments, include a screwed flanged 406 configured to secure the first connector body 200 to the second connector body 300. As illustrated, the screwed flange 406 may include two (2) or more threaded members configured to circumferentially surround each of the first connector body 200 and the second connector body 300. As the threaded members are rotated into threaded engagement with one another, the screwed flange 406 may drive or otherwise force contact between the first connector body 200 and the second connector body 300.

With continued reference to FIG. 4, as described above, the first inner bore 202 may engage with the second inner bore 302 so as to form a first fluid channel 402. The first fluid channel 402 may be in fluid communication with the first fluid supply line illustrated in FIG. 1A so as to transfer a first fluid to or from the first fluid supply line 102. Similarly, the first plurality of outer bores 204 may engage with the second plurality of outer bores 304 so as to form a second fluid channel 404. The second fluid channel 404 may be in fluid communication with the second fluid supply line illustrated in FIG. 1A so as to transfer a second fluid from or to the second fluid supply line 104. In this way, the first fluid channel 402 and the second fluid channel 404 may be concentric such that the second fluid channel 404 substantially surrounds the first fluid channel 402. Although illustrated with a first fluid channel 402 transferring fluid in a direction opposite the transfer of fluid by the second fluid channel 404, the present disclosure contemplates that the flow direction of either fluid channel 402, 404 may be reversed. Said differently, the flow direction of the first fluid channel 402 and the flow direction of the second fluid channel 404 may, in some embodiments, be substantially the same.

As shown in the operational configuration of FIG. 4, the first groove 206 may be disposed circumferentially around the first fluid channel 402 such that a first sealing element (not shown) received therein may contact the first sealing surface 306 and seal the first fluid channel 402 from the second fluid channel 404. The second groove 208 may be disposed circumferentially around the second fluid channel 404 such that a second sealing element (not shown) received therein may contact the second sealing surface 308 and seal the second fluid channel 404 from an external environment of the fluid flow connector 106. Although illustrated and described herein with reference to a first fluid channel 402 substantially surrounded by the second fluid channel 404, the present disclosure contemplates that the size, flowrate, or any other parameter of the first fluid channel 402 and/or the second fluid channel 404 may be modified based upon the intended application of the fluid flow connector 106.

Figure 5:
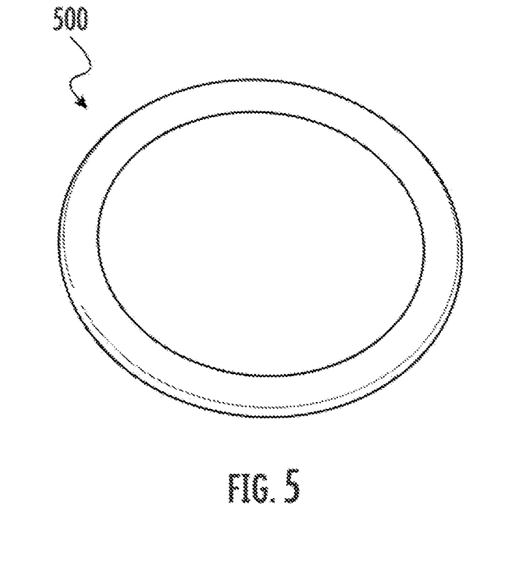
FIG. 5 is an example sealing element for use with some example embodiments described herein.

With reference to FIG. 5, an example sealing element 500 (e.g., first sealing element and/or second sealing element) is illustrated. As shown, the sealing element 500 may define a circular or O-ring shape for receipt by either the first groove 206 or the second groove 208. In some embodiments, such as instances in which the first fluid and/or the second fluid are transferred at a cryogenic temperature, the sealing element 500 may comprise or otherwise be formed of a malleable, cryogenic sealing material. By way of a more particular example, the sealing element 500 may comprise or otherwise be formed of indium. In such an embodiment, a first sealing element formed of indium may be placed within the first groove 206 and a second sealing element formed on indium may be placed with the second groove 208. The use of indium or other malleable, cryogenic sealing materials may operate to seal the first fluid channel 402 and the second fluid channel 404 as described above. Unlike elastomers that contract and may leak at cryogenic temperatures, the use of a malleable, cryogenic sealing materials such as indium may operate to substantially seal the first fluid channel 402 and the second fluid channel 404.

Figure 6:
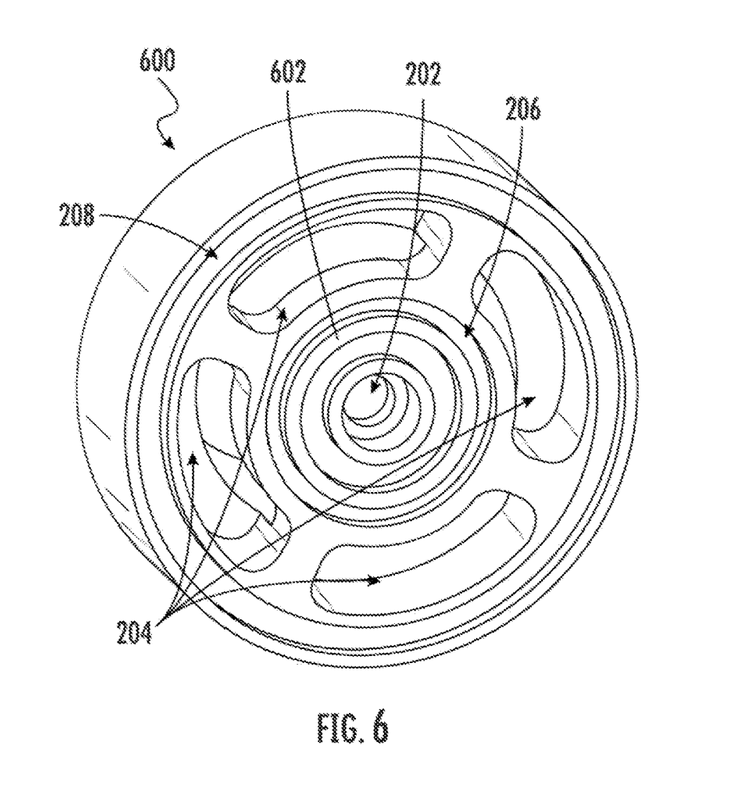
FIG. 6 is a perspective view of another example first connector body according to an example embodiment.

With reference to FIG. 6, another example first connector body 600 is illustrated. As shown, the first connector body 600 may include a first inner bore 202, a first plurality of outer bores 204, a first groove 206, and a second groove 208 similar to the first connector body 200 described above. In the first connector body 600, however, the first groove 206 and the second groove 208 further include a deformation feature 602 (e.g., inverted dimple, knife's edge, ridge, or the like configured to plastically deform the first sealing element and the second sealing element. By way of example, in some embodiments, the first sealing element and/or the second sealing element (e.g., sealing element 500) may comprise a deformable material (e.g., copper wire or the like) such that, when inserted within the first groove 206 and/or second groove 208 and engaged with the first sealing surface 306 and/or the second sealing surface 308, the deformation feature 602 may plastically deform the sealing elements so as to ensure a proper seal for the first fluid channel 402 and/or the second fluid channel 404. Said differently, the deformation feature 602 may deform the structure of the respective sealing element such that the sealing element properly fills the first groove 206 and/or the second groove 208.

Example Methods

Figure 7:
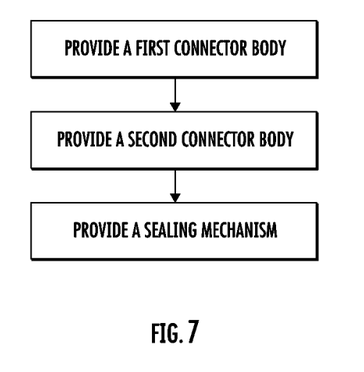
FIG. 7 is a flowchart illustrating a method for fluid flow connectors according to an example embodiment.

With reference to FIG. 7, an example method for fluid flow connectors according to embodiments of the present disclosure is illustrated. The method (e.g., method 700) may include the step of providing a first connector body 200. As described above, the first connector body 200 may define a first inner bore 202 located substantially at the center of the first connector body 200. The first connector body 200 may further define a first plurality of outer bores 204 positioned radially around the first inner bore 202. The method 700 may also include the step of providing a second connector body 200. The second connector body 300 may define a second inner bore 302 located substantially at the center of the second connector body 300. The second connector body 300 may further define a second plurality of outer bores 304 positioned radially around the second inner bore 302. As described above with reference to the operational configuration, the second inner bore 302 may be configured to be in fluid communication with the first fluid supply line 102 such that, in combination with the first inner bore 202 of the first connector body 200, the second inner bore 302 may form a portion of the first fluid supply channel for transferring the first fluid supplied by the first fluid supply line 102. Similarly, the second plurality of outer bores 304 may be configured to be in fluid communication with the second fluid supply line 104 such that, in combination with the first plurality of outer bores 204 of the first connector body 200, the second plurality of outer bores 304 may form a portion of the second fluid supply channel (e.g., second fluid supply channel 402) for transferring the second fluid supplied by the second fluid supply line 104.

The method 700 may also include the step of providing a sealing mechanism. As described above, the first connector body 200 may further define a sealing mechanism (e.g., a first groove 206 and a second groove 208) configured to, in the operational configuration, seal the first fluid channel (e.g., the mated first inner bore 202 and the second inner bore 302) from the second fluid channel (e.g., the mated first plurality of outer bores 204 and the second plurality of outer bores 304) and seal the second fluid channel from an external environment of the fluid flow connector 106. The first groove 206 may be positioned circumferentially around the first inner bore 202 and configured to receive a first sealing element therein. The first sealing element received by the first groove 206 may be configured to abut or otherwise contact a corresponding sealing surface (e.g., first sealing surface 306) of the second connector body 300. The contact between the first sealing element within the first groove 206 and the corresponding surface of the second connector body 300 may operate to seal the first fluid channel (e.g., the mated first inner bore 202 and the second inner bore 302) from the second fluid channel (e.g., the mated first plurality of outer bores 204 and the second plurality of outer bores 304).

The first connector body 200 may further define a second groove 208 that may be positioned circumferentially around the first plurality of outer bores 204 and configured to receive a second sealing element therein. The second sealing element received by the second groove 208 may be configured to abut or otherwise contact a corresponding sealing surface (e.g., second sealing surface 308) of the second connector body 300. The contact between the second sealing element within the second groove 208 and the corresponding surface of the second connector body 300 may operate to seal the second fluid channel (e.g., the mated first plurality of outer bores 204 and the second plurality of outer bores 304) from an external environment of the fluid flow connector 106.

In an example embodiment, the method 700 further includes securing the first connector body 200 to the second connector body 300. For example, the first connector body 200 may be secured to the second connector body 300 may be coupled and/or secured to one another such that the mating surface of the first connector body 200 is mated to the mating surface of the second connector body 300. For example, the first inner bore 202 may be coupled to the second inner bore 302 such that a first fluid channel is provided. For example, each of the plurality of first outer bores 204 may be coupled to a respective one of the plurality of second outer bores 304 such that a second fluid channel is provided. For example, the first connector body 200 may be coupled and/or secured to the second connector body 300 by bolts 108 through a plurality of through-holes 110. In another example, the first connector body 200 may be coupled and/or secured to the second connector body 300 by a screwed flanged 406.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fluid flow connector that is operable at cryogenic temperatures, the fluid flow connector comprising:
    a first connector body defining:
        a first inner bore; and
        a first plurality of outer bores;
    a second connector body defining:
        a second inner bore; and
        a second plurality of outer bores, wherein, in an operational configuration in which the first connector body is attached to the second connector body, the first inner bore is configured to mate with the second inner bore to form a first fluid channel, and the first plurality of outer bores are each configured to mate with a respective one of the second plurality of outer bores to form a second fluid channel; and
    a sealing mechanism configured to, in the operational configuration, seal the first fluid channel from the second fluid channel and seal the second fluid channel from an external environment of the fluid flow connector, the sealing mechanism comprising at least one groove and at least one sealing element disposed within the at least one groove, wherein the at least one groove is defined by two side walls that extend outward from a base, the at least one sealing element comprises a material that is deformable at cryogenic temperatures, and the at least one groove comprises a deformation feature that extends outward from the base and is configured to plastically deform the at least one sealing element.

2. The fluid flow connector according to claim 1, wherein, in the operational configuration, the first fluid channel and the second fluid channel are concentric such that the second fluid channel surrounds the first fluid channel.

3. The fluid flow connector according to claim 2, wherein the sealing mechanism comprises a first sealing element disposed circumferentially around the first fluid channel and a second sealing element disposed circumferentially around the second fluid channel.

4. The fluid flow connector according to claim 1, wherein the at least one sealing element comprises a first sealing element and a second sealing element and the at least one groove of the sealing mechanism is defined by the first connector body and comprises:
    a first groove configured to receive the first sealing element therein, wherein the first groove is positioned circumferentially around the first inner bore; and
    a second groove configured to receive the second sealing element therein, wherein the second groove is positioned circumferentially around the first plurality of outer bores.

5. The fluid flow connector according to claim 4, wherein the second connector body further defines:
    a first sealing surface configured to abut the first sealing element positioned within the first groove; and
    a second sealing surface configured to abut the second sealing element positioned within the second groove.

6. The fluid flow connector according to claim 4, wherein the first sealing element and the second sealing element comprise indium.

7. The fluid flow connector according to claim 4, wherein the first groove and the second groove each define a respective deformation feature configured to plastically deform the first sealing element and the second sealing element, respectively.

8. The fluid flow connector according to claim 1, wherein the first connector body and the second connector body each define one or more through-holes configured to receive corresponding bolts therein such that, in the operational configuration, the bolts are configured, via the through-holes, to secure the first connector body to the second connector body.

9. The fluid flow connector according to claim 1, further comprising a screwed flange configured to secure the first connector body to the second connector body.

10. A method comprising:
    providing a first connector body wherein the first connector body defines:
        a first inner bore; and
        a first plurality of outer bores;

providing a second connector body wherein the second connector body defines:
  a second inner bore; and
  a second plurality of outer bores, wherein, in an operational configuration in which the first connector body is attached to the second connector body, the first inner bore is configured to mate with the second inner bore to form a first fluid channel, and the first plurality of outer bores are each configured to mate with a respective one of the second plurality of outer bores to form a second fluid channel; and
providing a sealing mechanism configured to, in the operational configuration, seal the first fluid channel from the second fluid channel and seal the second fluid channel from an external environment of the fluid flow connector, the sealing mechanism comprising at least one groove and at least one sealing element disposed within the at least one groove, wherein the at least one groove is defined by two side walls that extend outward from a base, the at least one sealing element comprises a material that is deformable at cryogenic temperatures, and the at least one groove comprises a deformation feature that extends outward from the base and is configured to plastically deform the at least one sealing element.

11. The method according to claim 10, wherein, in the operational configuration, the first fluid channel and the second fluid channel are concentric such that the second fluid channel surrounds the first fluid channel.

12. The method according to claim 11, wherein providing the sealing mechanism disposing a first sealing element circumferentially around the first fluid channel and disposing a second sealing element circumferentially around the second fluid channel.

13. The method according to claim 10, wherein the at least one sealing element comprises a first sealing element and a second sealing element and the at least one groove of the sealing mechanism is defined by the first connector body and comprises:
  a first groove configured to receive the first sealing element therein, wherein the first groove is positioned circumferentially around the first inner bore; and
  a second groove configured to receive the second sealing element therein, wherein the second groove is positioned circumferentially around the first plurality of outer bores.

14. The method according to claim 13, wherein the second connector body further defines:
  a first sealing surface configured to abut the first sealing element positioned within the first groove; and
  a second sealing surface configured to abut the second sealing element positioned within the second groove.

15. The method according to claim 13, wherein the first sealing element and the second sealing element comprise indium.

16. The method according to claim 13, wherein the first groove and the second groove each define a respective deformation feature configured to plastically deform the first sealing element and the second sealing element, respectively.

17. The method according to claim 10, wherein the first connector body and the second connector body each define one or more through-holes configured to receive corresponding bolts therein such that, in the operational configuration, the bolts are configured, via the through-holes, to secure the first connector body to the second connector body.

18. The method according to claim 10, further comprising providing a screwed flange configured to secure the first connector body to the second connector body.

* * * * *